(12) United States Patent
Dhruv et al.

(10) Patent No.: US 9,747,263 B1
(45) Date of Patent: Aug. 29, 2017

(54) DYNAMIC PAGE CLASSIFIER FOR RANKING CONTENT

(71) Applicant: Google Inc., Mountain View, CA (US)

(72) Inventors: Mikhail Dhruv, Palo Alto, CA (US); Mario Ventura Anima, Sunnyvale, CA (US); Ming Lei, Mountain View, CA (US); Prasenjit Sarkar, Sunnyvale, CA (US); Lucian Florin Cionca, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 115 days.

(21) Appl. No.: 14/318,044

(22) Filed: Jun. 27, 2014

(51) Int. Cl.
    *G06F 17/22* (2006.01)
    *G06F 17/30* (2006.01)

(52) U.S. Cl.
    CPC ...... *G06F 17/2247* (2013.01); *G06F 17/2288* (2013.01); *G06F 17/30905* (2013.01)

(58) Field of Classification Search
    CPC ............. G06F 17/2288; G06F 17/2247; G06F 17/30905; H04L 67/10
    See application file for complete search history.

(56) References Cited

U.S. PATENT DOCUMENTS

| | | | |
|---|---|---|---|
| 7,343,412 B1 * | 3/2008 | Zimowski | G06F 17/30902 709/203 |
| 8,447,852 B1 * | 5/2013 | Penumaka | G06Q 30/02 709/217 |
| 9,213,462 B2 * | 12/2015 | Gunderson | G06F 3/0481 |
| 2003/0202482 A1 * | 10/2003 | Dittmann | H04L 69/28 370/252 |
| 2007/0250791 A1 * | 10/2007 | Halliday | G06Q 10/10 715/808 |
| 2010/0100904 A1 * | 4/2010 | Kawakami | H04N 7/17318 725/37 |
| 2012/0072957 A1 * | 3/2012 | Cherukuwada | H04N 21/23412 725/93 |
| 2012/0079429 A1 * | 3/2012 | Stathacopoulos | G06F 17/30979 715/830 |
| 2013/0238975 A1 * | 9/2013 | Chan | G06F 17/30902 715/234 |
| 2013/0346476 A1 * | 12/2013 | Jasperson | H04L 67/142 709/203 |
| 2014/0279038 A1 * | 9/2014 | Lombard | G06Q 30/0269 705/14.66 |
| 2014/0279162 A1 * | 9/2014 | Gladis | G06Q 30/08 705/26.3 |
| 2015/0026604 A1 * | 1/2015 | Mulukuri | G06Q 50/01 715/758 |
| 2015/0082328 A1 * | 3/2015 | Bradley | H04N 21/2543 725/2 |

* cited by examiner

*Primary Examiner* — Thu Huynh
(74) *Attorney, Agent, or Firm* — Patent Law Works LLP

(57) ABSTRACT

A system comprising a processor and a memory storing instructions that, when executed, cause the system to identify a page on a website, retrieve a stream of posts related to the page, determine whether the page is dynamic, in response to the page being determined to be dynamic, modify the stream of posts related to the page biased toward including more recent posts, generate a user interface element for display of the stream of related content; and provide the user interface element for presentation to the user. The disclosure also includes similar methods and computer program products.

21 Claims, 12 Drawing Sheets

DYNAMIC PAGE CLASSIFIER FOR RANKING CONTENT

BACKGROUND

The present disclosure relates to classifying a page to improve the presentation of content. In particular, the present disclosure relates to a dynamic page classifier for web pages than can be used to generate stream content.

The popularity and use of the Internet, web browsers, social networks and other types of electronic communication has grown dramatically in recent years. In particular, social networks now include a great amount of content including posts, images, endorsements, activity, videos, etc. Users are interested in viewing content related to particular web pages or other web information from other sources, but there are only limited ways presently to view information from social networks in other contexts. Typically the user must switch between one browser window for viewing the web page and another browser window for viewing content from and interacting with a social network. Thus, it remains difficult to secure and view content related to a particular web page or URL other than the webpage itself. Furthermore, the existing mechanisms for determining which posts, images, endorsements, activity should be presented to the user are also inadequate when the information from the social network is related to web pages.

SUMMARY

The present disclosure relates to systems and methods for classifying web pages and presenting and interacting with stream content related to the web page. According to one innovative aspect of the subject matter in this disclosure, a system comprising a processor and a memory storing instructions that, when executed, cause the system to identify a page on a website, retrieve a stream of posts related to the page, determine whether the page is dynamic, in response to the page being determined to be dynamic, modify the stream of posts related to the page biased toward including more recent posts, generate a user interface element for display of the stream of related content; and provide the user interface element for presentation to the user.

In general, another innovative aspect of the subject matter described in this disclosure may be implemented in methods that include identifying, using one or more processors, a page on a website; retrieving, using the one or more processors, a stream of posts related to the page; determining, using the one or more processors, whether the page is dynamic; in response to the page being determined to be dynamic, modifying the stream of posts related to the page biased toward including more recent posts; generating, using the one or more processors, a user interface element for display of the modified stream of posts; and providing, using the one or more processors, the user interface element for presentation to the user.

Other implementations of one or more of these aspects include corresponding systems, apparatus, and computer programs, configured to perform the actions of the methods, encoded on computer storage devices.

These and other implementations may each optionally include one or more of the following features. For example, the operations may further include: in response to the page being determined not to be dynamic, generating a modified stream of posts biased toward including more engaging posts; determining a recentness of the one or more posts related to the page; or determining user engagement with the one or more posts related to the page. For instance, the operations may further include: determining a number of posts in the stream of posts related to the page, determining an age of an oldest post in the stream of posts related to the page, and determining a percentage of posts in a window before the oldest post; or wherein a page is dynamic if the number of posts in the stream of posts related to the page is greater than a first threshold, the age of the oldest post in the stream of posts related to the page is older than a set date, and the percentage of posts in the window before the oldest post is less than a second threshold. The operations may also include determining whether the page is dynamic by determining an age for the page, determining content of the page, and wherein a page is dynamic if the age of the page is greater than a set time, and the content of the page is determined to be dynamic.

These implementations are particularly advantageous in a number of respects. For instance, the technology described herein is able to classify with minimal cost. Additionally, the classification can be performed relatively quickly and does not need any additional storage space. The methods only need to use data available at the time of ranking, and do not need to make any costly requests for additional data. Moreover, the heuristics are intuitive and easy to tune based on empirical results. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Systems, methods and interfaces to generate a stream of content using a dynamic page classifier and show the stream related to web page are disclosed. While the systems, methods and interfaces of the present disclosure are described in the context of a social network and generating a stream of related posts using a dynamic page classifier, it should be understood that the systems, methods and interfaces can be applied to other systems external to the social network, for example, for ranking the relevance of web pages to a search query.

Figure 1:
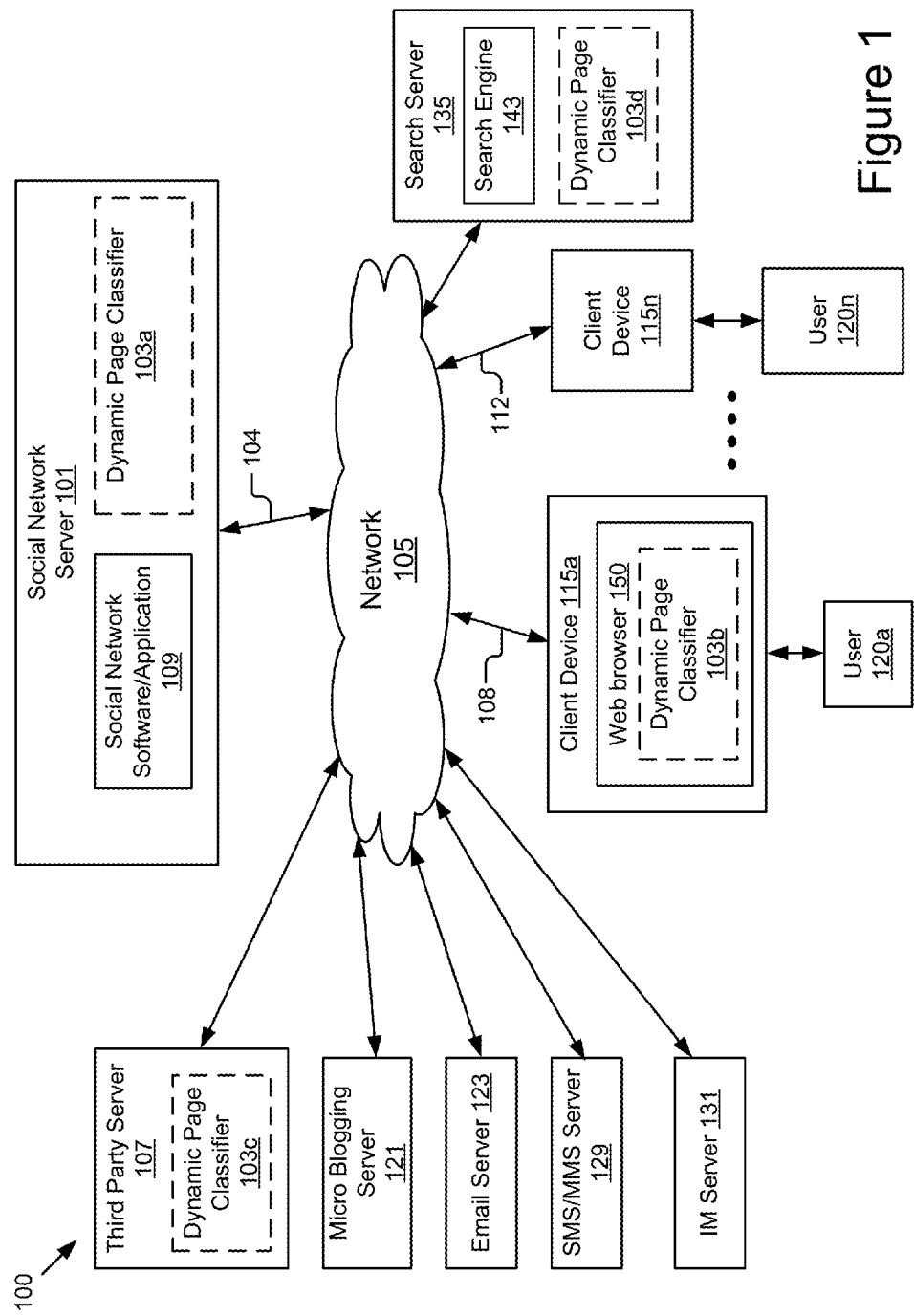
FIG. 1 is a high-level block diagram illustrating an example system for ranking page content with a dynamic page classifier.

FIG. 1 illustrates a high-level block diagram of a system 100 for generating and presenting a stream of content using a dynamic page classifier according to some implementations of the present disclosure. The illustrated system 100 includes client devices 115a-115n (also referred to herein individually and collectively as 115) that are accessed by users 120a-120n (also referred to herein individually and collectively as 120), a social network server 101 having a social network application 109 and a dynamic page classifier 103a (also referred to herein individually and collectively as 103). The system 100 also includes a number of products or services offered by a third party server 107, a micro blogging server 121, an email server 123, a Short Message Service (SMS)/Multimedia Messaging Service (MMS) server 129, an Instant Messaging (IM) server 131 and a search server 135. In the illustrated implementation, these entities are communicatively coupled via a network 105. These systems 101, 107, 121, 123, 129, 131, 135 are merely examples and the system 100 in some implementations includes an advertisement server, a document server, a blogging server, a news feed server, a video sharing server, a photo sharing server, a map server and any other third party server, etc.

The client devices 115a-115n in FIG. 1 are used by way of example. While FIG. 1 illustrates two client devices 115a and 115n, the present disclosure applies to any system architecture having one or more client devices 115. Furthermore, while only one network 105 is coupled to the client devices 115a-115n, the social network server 101, the third party server 107, the micro blogging server 121, the email server 123, the Short Message Service (SMS)/Multimedia Messaging Service (MMS) server 129, the Instant Messaging (IM) server 131 and the search server 135, in practice one or more networks 105 can be connected to these entities. Furthermore, while only one the third party server 107 is shown, the system 100 can include one or more third party servers 107. Furthermore, while only one social network server 101 is shown, the system 100 can include one or more social network servers 101.

While shown as operational on the social network server 101 in FIG. 1, in some implementations all or part of the dynamic page classifier 103b may be operational on the one or more of the client devices 115, the third party server 107 or the search server 135, for example, as dynamic page classifier 103b, 103c and 103d, respectively. The dynamic page classifier 103 interacts with the servers 101, 107 and 135 via the network 105. The dynamic page classifier 103 is also coupled for communication with the client device 115a, which is connected to the network 105 via signal line 108. The user 120a interacts with the client device 115a. Similarly, the client device 115n is coupled to the network 105 via signal line 112 and the user 120n interacts with the client device 115n. The user 120 is a human user of the client device 115. It should be recognized that the dynamic page classifier 103 can be stored in any combination of the devices and servers, or in only one of the devices or servers. The dynamic page classifier 103 will be describe in more detail with reference to FIGS. 2-6C.

The social network server 101 is coupled to the network 105 via signal line 104 for communication and cooperation with the other components of the system 100. In some implementations, the social network server 101 includes the social network software/application 109. Although only one social network server 101 is shown, it should be recognized that multiple servers may be present. A social network may be any type of social structure where the users 120 are connected by a common feature. The common feature includes relationships/connections, e.g., friendship, family, work, an interest, etc. The common features are provided by one or more social networking systems, for example, those included in the system 100, including explicitly-defined relationships and relationships implied by social connections with other online users, where the relationships form a social graph. In some examples, the social graph can reflect a mapping of these users and how they are related. The phrase social graph as used herein encompasses its plain and ordinary meaning including, but not limited to, a file that includes the relationships between the users in a social network. For example, users can be friends, acquaintances, have business relationships, one user can follow another user, one user can subscribe to another user, share with other users or a specific user, etc. Furthermore, it should be understood that the social network server 101 and the social network software/application 109 are representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating and others of general interest or a specific focus.

In some implementations, the social network server 101 receives and sends data and social information provided by the other servers 107, 121, 123, 129, 131 and 135. For example, the social network server 101 receives and sends any social information or events performed on any web pages and/or applications hosted by the servers 107, 121, 123, 129, 131 and 135. The web pages and/or applications include a user interface allowing a user 120 to respond to, comment or endorse a product, a video, a search result, a widget, a post, a comment, a photo, an article, etc., shown on the web pages and/or applications.

In some implementations, the social network server 101, the third party server 107, the Micro Blogging server 121, the email server 123, the SMS/MMS server 129, the IM server 131 and the search server 135 are hardware servers including a processor, a memory, and network communication capabilities.

The client devices 115 can be any computing device including one or more memory and one or more processors, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network. In some implementations, the system 100 includes a combination of different types of client devices 115. For example, a combination of a personal computer and a mobile phone. As will be described below, it should be understood that the present technologies can operate on different models other than a client-server architecture. For example, the client devices 115 may include the dynamic page classifier 103 and include different services. The client device 115 will be described in more detail with reference to FIG. 2.

The browser 150 can be a web browser stored on the client device 115 and configured for two-way communications with the servers 173, 101, 107, 121, 123, 129, 131 and 135. For example, the browser 150 is a software application for retrieving, presenting and traversing information resources on the web. In the illustrated implementation, the browser 150 includes a dynamic page classifier 103b or it may be operational on the client device 115.

The network 105 enables communications between the client devices 115a-n, the social network server 101, the third party server 107, the Micro Blogging server 121, the email server 123, the SMS/MMS server 129, the IM server 131 and the search server 135. Thus, the network 105 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In some implementations, the entities can use custom and/or dedicated data communications technologies instead of, or in addition to, the ones described above. Depending upon the implementation, the network 105 can also include links to other networks.

In some implementations, the network 105 is a partially public or a wholly public network, for example, the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wired or wireless (i.e., terrestrial or satellite-based transceivers). In some implementations, the network 105 is an IP-based wide or metropolitan area network.

The network 105 may have any number of configurations including a star configuration, token ring configuration or other configurations. Furthermore, the network 105 may include a local area network (LAN), a wide area network (WAN) (e.g., the Internet), and/or any other interconnected data path across which multiple devices may communicate. In some implementations, the network 105 may be a peer-to-peer network. The network 105 may also be coupled to or include portions of a telecommunications network for sending data in a variety of different communication protocols. In some implementations, the network 105 includes short-wavelength communication networks or a cellular communications network for sending and receiving data including via short messaging service (SMS), multimedia messaging service (MMS), hypertext transfer protocol (HTTP), direct data connection, wireless application protocol (WAP), electronic messages, etc.

Figure 2:
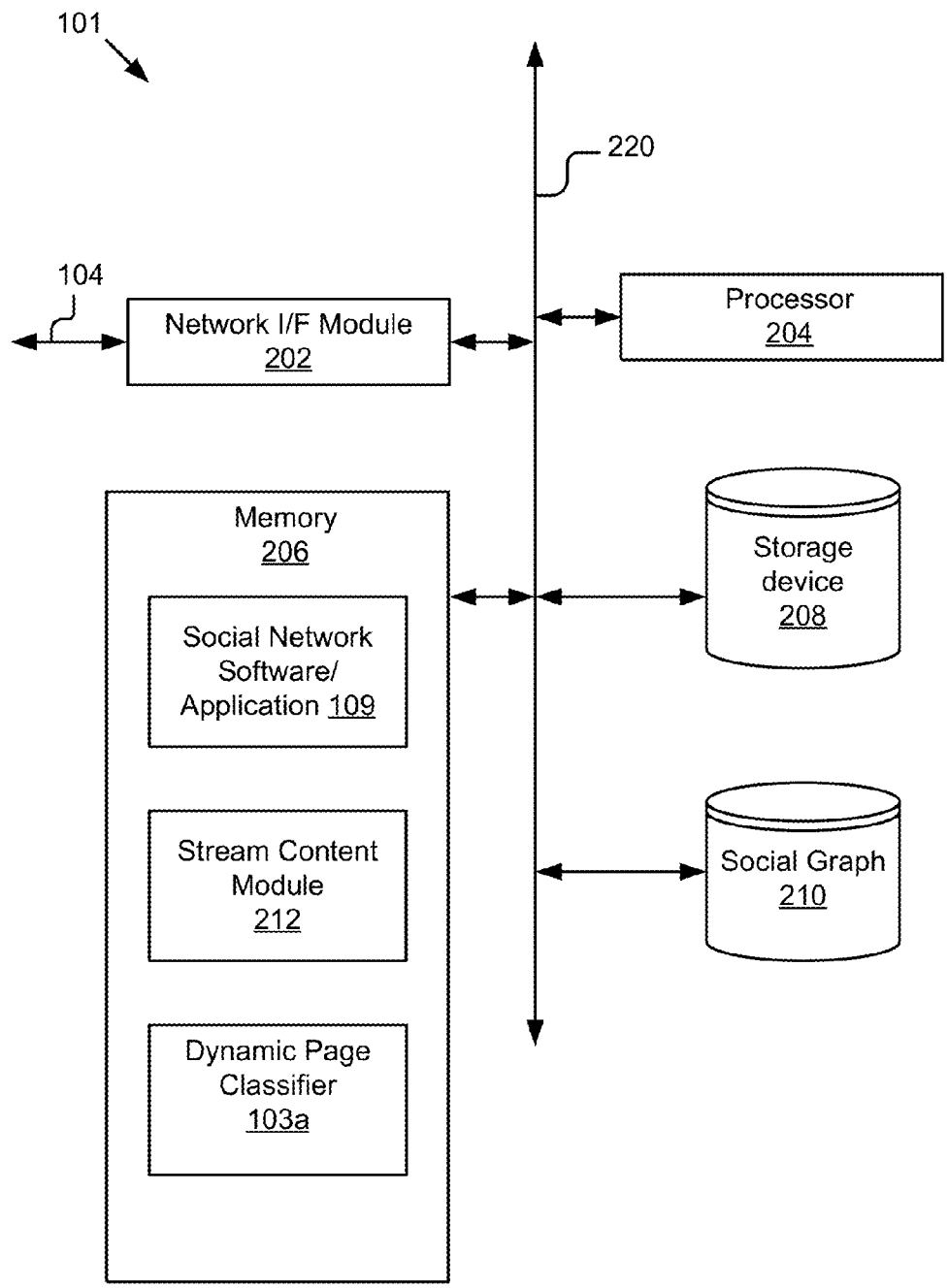
FIG. 2 is a block diagram illustrating an example social network server including a dynamic page classifier.

FIG. 2 illustrates the social network server 101 according to some implementations of the present disclosure. In the illustrated implementations, the social network server 101 includes the network interface (I/F) module 202, a processor 204, a memory 206, a storage device 208, and a social graph 210. These components of the social network server 101 are communicatively coupled to a bus or software communication mechanism 220 for communication with each other.

The network interface module 202 is coupled to the network 105 by signal line 104. The network interface module 202 is also coupled to the bus 220. The network interface module 202 includes ports for wired connectivity including but not limited to USB, SD, or CAT-5, etc. The network interface module 202 links the processor 204 to the network 105 that may in turn be coupled to other processing systems. The network interface module 202 provides other conventional connections to the network 105 using standard network protocols, e.g., TCP/IP, HTTP, HTTPS and SMTP. In some implementations, the network interface module 202 includes a transceiver for sending and receiving signals using WiFi, Bluetooth® or cellular communications for wireless communication.

The processor 204 may include an arithmetic logic unit, a microprocessor, a general purpose controller or some other processor array to perform computations and provide electronic display signals to a display device. In some implementations, the processor 204 is a hardware processor. The processor 204 is coupled to the bus 220 for communication with the other components. Processor 204 processes data signals and may include various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. It should be understood that other processors, operating systems, sensors, displays and physical configurations are possible.

The memory 206 stores instructions and/or data that may be executed by the processor 204. In the illustrated implementation, the memory 206 stores the social network software/application 109, the stream content module 212 and the dynamic page classifier 103a. The memory 206 is coupled to the bus 220 for communication with the other components of the social network server 101. The instructions and/or data may include code for performing any and/or all of the techniques described herein. The memory 206 may be a dynamic random access memory (DRAM) device, a static random access memory (SRAM) device, flash memory or some other memory devices.

The storage device 208 may be a non-transitory memory that stores data. For example, the storage device 208 may be a dynamic random access memory (DRAM) device, a static random access memory (SRAM) device, flash memory or some other memory device. In some implementations, the storage device 208 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device. In some implementations, the storage device 208 stores data received from and sent to users 120 to accomplish the functionalities described herein of the dynamic page classifier 103a.

Software communication mechanism 220 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc). The software communication mechanism 220 can be implemented on any underlying hardware, for example, a network, the Internet, a bus, a combination thereof, etc.

The stream content module 212 can be software or routines for generating a stream of content tailored or particular to the user. In FIG. 2, the stream content module 212 is shown as a module operational a part of memory 206. In some implementations, the stream content module 212 may be part of the social network application 109. The social network application 109 may cooperate with the social network application 109 to generate and provide the stream of content. Based upon the user's interests, social graph, interactions and other factors, the stream content module 222 may generate a stream of content tailored to the user. The stream content module 212 may be software including routines for generating and providing the stream of content. In some implementations, the stream content module 212 may be a set of instructions executable by the processor 204 to provide the functionality described herein for generating and providing the stream of content. In some implementations, the stream content module 212 may be stored in the memory 206 of the server 101 and is accessible and executable by the processor 204. In some implementations, the stream content module 212 may be adapted for cooperation and communication with the processor 204 and other components of the server 101 via bus 220.

The dynamic page classifier 103a evaluates a web page and determines whether the web page is dynamic or static. A dynamic webpage is one that has its content updated frequently. For example, a page that contains live updates of the company stock information is considered to be a dynamic webpage. Static pages, on the other hand, rarely have their content changed. One example is a news article about the outcome of a basketball game. The present disclosure use of the fact that a page is dynamic or static to provide more relevant content to a user. Depending on the classification of the web page, the dynamic page classifier 103a modifies the stream of content generated to provide more posts of one type or another. For example, the dynamic page classifier 103a may bias the stream of content to includes more posts that have freshness or recentness if the web page is determined to be dynamic and more posts that have high engagement values if the web page is determined to be static. The dynamic page classifier 103a then generates a user interface element for presentation and interaction with stream content produce with the page classification input. The operation of the dynamic page classifier 103a will be described in more detail with reference to FIGS. 3-6C. In some implementations, the dynamic page classifier 103a may interact on other servers including the third party server 107, the Micro Blogging server 121, the email server 123, the SMS/MMS server, the IM server 131, the search server 135 and any other entities (not pictured) that can be included in the system 100.

In some implementations, the dynamic page classifier 103a determines a social signal or receives a social signal from the social network application 101 based on the received data associated with the user 120. For example, the social network application 101 or receives social data describing user social activities, endorsements, and status and determines a social signal based on the social data. For example, the dynamic page classifier 103a can filter the received social data and determine a social signal relevant to the user 120. For example, a social signal may be a signal indicating a recent social activity performed by the user 120 or social connections of the user 120 (e.g., followers, friends, family, etc.). For example, a social signal indicates that the user 120 has just submitted a post about a new car. For example, a social signal may indicate that a friend of the user's has updated the status as graduated from school.

In some implementations, the dynamic page classifier 103a determines one or more interests of the user 120 based on one or more of the social signal, the location, the context and the search data associated with the user 120. In some implementations, the dynamic page classifier 103a receives a social signal from the social network application 101 that includes one or more interests of the user. The dynamic page classifier 103a can then use this signal to determine relevant social content (e.g., relevant posts on social networks) to provide to the user 120. In some implementations, the dynamic page classifier 103a can also rank the relevant social content based on the relevance and provide the user 120 with social content that has a ranking above a predetermined threshold. In some implementations, the dynamic page classifier 103 includes the ranked content in the user interface element and provides the user interface element which may include information, formatting data, layout data, selectable links for actions or tasks, as well as other information necessary to execute such actions or tasks.

Figure 3:
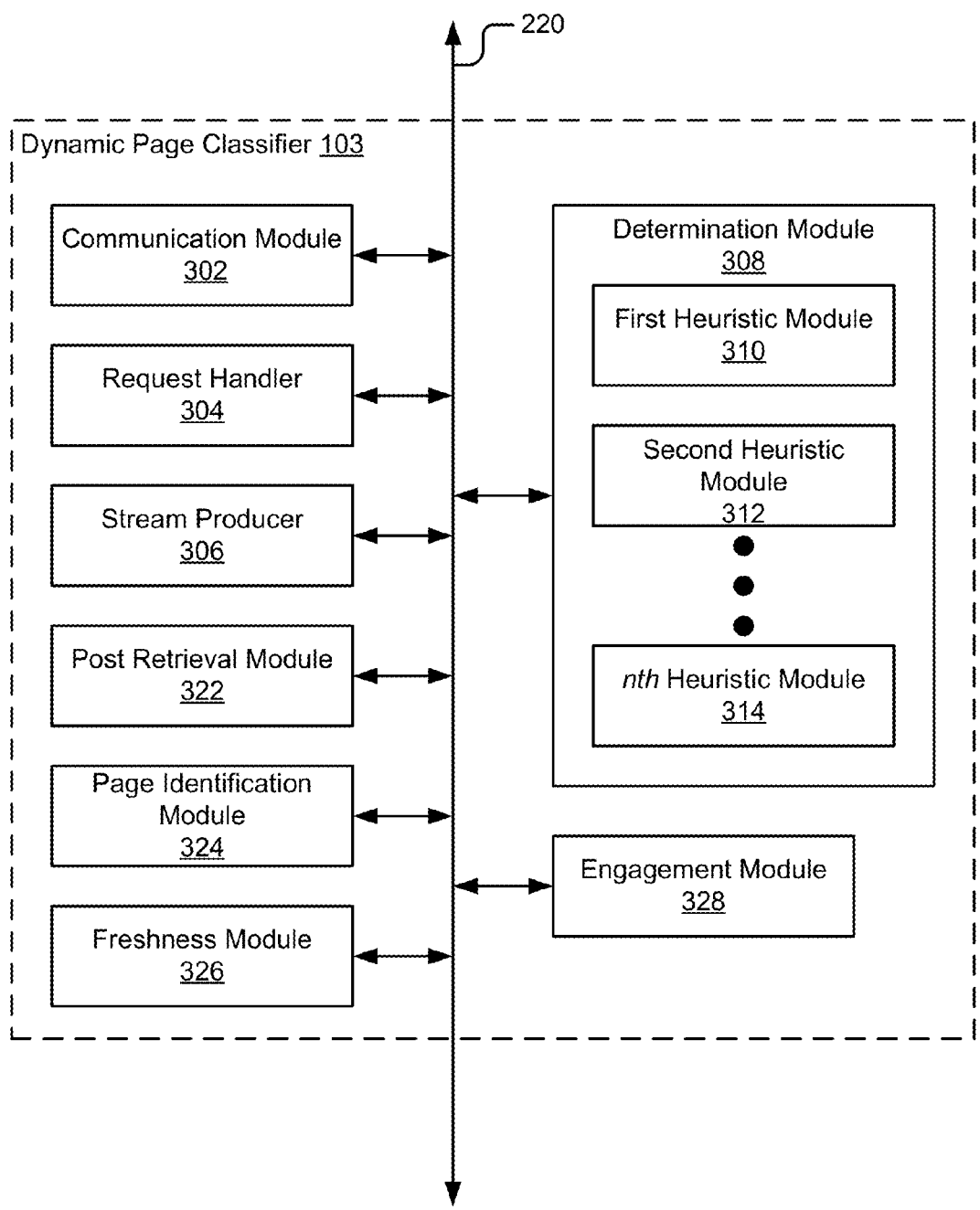
FIG. 3 is a block diagram illustrating an example dynamic page classifier.

Referring now to FIG. 3, the dynamic page classifier 103a is described in more detail according to some implementations. The dynamic page classifier 103a includes a communication module 302, a request handler 304, a stream producer 306, a determination module 308, a post retrieval module 322, a page identification module 324, a freshness module 326, and an engagement module 328. Each of these components is coupled to the software communication mechanism 220 for communication with each other and the other components of the social network server 101.

The communication module 302 can be software or routines for handling communications between the request handler 304, the stream producer 306, the determination module 308, the post retrieval module 322, the page identification module 324, the freshness module 326, and the engagement module 322. The communication module 302 also facilitates communication with the other components of the social network server 101 as well as communication with the other components of the system 100 via the network interface module 202 and the network 105. For example, the communication module 302 may send signal between widgets, browsers and other devices, and the components of the dynamic page classifier 103. In some implementations, the communication module 302 is a set of instructions executable by the processor 204. In some implementations, the communication module 302 is stored in the memory 206 of the social network server 101 and is accessible and executable by the processor 204. In some implementations, the communication module 302 is adapted for cooperation and communication with the processor 204, the memory 206 and other components of the dynamic page classifier 103a via the bus 220.

The request handler 304 can be software or routines for receiving a request for information related to a webpage. For example, the request handler 304 receives a request for social information related to the webpage generated by a widget including the canonical identifier that identifies the webpage. The request handler 304 then initiates a process to classify the web page and generate a user interface element that includes stream content related to the web page. The request handler 304 receives other input related to presentation of the user interface element; and generates and sends signals to the other components of the dynamic page classifier 103 to update the user interface element or take an action related to the stream of content related the web page. In some implementations, the request handler 304 is a set of instructions executable by the processor 204. In some implementations, the request handler 304 is stored in the memory 206 of the social network server 101 and is accessible and executable by the processor 204. In some implementations, the request handler 304 is adapted for cooperation and communication with the processor 204, the memory 206 and other components of the dynamic page classifier 103a via the bus 220.

The stream producer 306 can be software or routines for generating a stream of content related to the web page. The stream producer 306 is coupled for communication with the request handler 304. The request handler 304 sends the canonical identifier included in the request from the widget to the stream producer 306. The stream producer 306 uses the canonical identifier to identify the webpage and to generate a stream of content. The stream producer 306 is also coupled for communication with the social network application 109 to retrieve content items. In some implementations the stream producer 306 is coupled to other systems to retrieve other content items related to the webpage from other sources. In some implementations, the stream producer generates a stream of related content using the webpage, the classification of the webpage (e.g., dynamic or static), the identification of the user and the social signal. The identification of the user can be based upon information retrieved by the dynamic page classifier 103 from the social network application 109 or from the web browser 150 based upon the user log in the registration with a profile server. The identification of the user can be based on other factors including frequently used Internet addresses, location, device identification numbers, etc. In some implementations, the stream producer 306 retrieves the social signal from the social network software/application 109. In some implementations, the stream producer 306 generates the social signal. In some implementations, the stream producer 306 is a set of instructions executable by the processor 204. In some implementations, the stream producer 306 is stored in the memory 206 of the social network server 101 and is accessible and executable by the processor 204. In some implementations, the stream producer 306 is adapted for cooperation and communication with the processor 204, the memory 206 and other components of the dynamic page classifier 103a via the bus 220.

In some implementations, the stream producer 306 also determines relevant content items from the stream of content for the user. For example, the stream of content for the user may be retrieved from the stream content module 212. The stream of content will have a plurality of content items related to the webpage. The stream producer 306 then identifies or filters the plurality of content items based upon input from the determination module 308, the freshness module 326, the engagement module 328, or a social signal for the user. The input provided from the determination module 308 is an indication as to whether the webpage is static or dynamic. In response to this webpage being static, the stream producer 306 will include more content items in the stream that have greater or higher user engagement values. In contrast, in response to the webpage being dynamic, the stream producer 306 will include more content items in the stream that have a greater or higher recentness or freshness values. This stream producer 306 is coupled to the freshness module 326 to receive recentness values and to the engagement module 328 to receive engagement values associated with content items retrieved from the social network application 109. The social signal may be interest of the user, activities of the user, location, a relationship of the user to other users, commenters, social graph, people using the URL, or any other social signal generated by the social network application that can be used to prioritize and filter the related stream of content items. In some implementations, the stream producer 306 also ranks one or more relevant content items by relevance to the user. In some implementations, the stream producer 306 ranks the one or more relevant content items by relevance to the user, then selects relevant content items with a ranking above a predefined threshold for presentation as part of the user interface element.

The determination module 308 can be software or routines for determining whether a webpage is dynamic or static. In some implementations, the determination module 308 makes its determination as to whether a webpage is dynamic or static by analyzing content items from a stream of content that are related to the webpage. For example, the determination module 308 may apply a series of heuristics to make its decision. As illustrated in FIG. 3, the determination module 308 may include one or more heuristic modules 310, 312 and 314. In this example, the determination module 308 is shown as including three different heuristic modules 310, 312 and 314. The determination module 308 determines whether a webpage is dynamic or static by applying the heuristic to information associated with the webpage. In some implementations, the determination module 308 may apply the heuristic to the stream of content items from the social network related to the webpage. The first heuristic module 310 may determine whether the number of posts in the stream of content items from the social network related to the webpage is above a certain threshold. For example, the number of posts may be required to be 10 or greater. A second heuristic module 312 may determine whether the oldest post in the stream of content items from the social network related to the webpage is above a certain age. For example, the oldest post may be required to be greater than 30 days old. A third heuristic module 314 may determine whether a percentage of post in a time window before the oldest post is under a certain threshold. For example, initially 50% of the post cannot be in a 72 hour window before the oldest post. If all three of the conditions in heuristic modules 310, 312 and 314 are satisfied, then the page is classified as dynamic; otherwise, the page is classified as static. It should be understood that the above three heuristics are merely examples. Various other heuristics criteria may be used based on the stream of content items from the social network. Further, some implementations of the determination module 308 may include as few as one heuristic module or many more heuristic modules. In some implementations, the determination module 308 may apply the heuristic to attributes of the webpage. For example, different heuristics may be used to determine the age of the webpage, whether the classification of the webpage needs changing, the content of the webpage, etc.

Example heuristics that may be included as part of the determination module 308 are shown and described in more detail below with reference to FIGS. 6A-6C. In some implementations, the determination module 308 is a set of instructions executable by the processor 204. In some implementations, the determination module 308 is stored in the memory 206 of the social network server 101 and is accessible and executable by the processor 204. In some implementations, the determination module 308 is adapted for cooperation and communication with the processor 204, the memory 206 and other components of the dynamic page classifier 103a via the bus 220.

The post retrieval module 322 can be software or routines for retrieving information from the social network, in particular, content items. The content items may include posts, images/photos, endorsements, activity, videos, shares, reshares, messages, etc. The post retrieval module 322 cooperates with social network application 109 to retrieve content items related to the webpage from the social network. In some implementations, the post retrieval module 322 receives an identifier or reference number (e.g., a canonical identifier) that specifically corresponds to the webpage. The post retrieval module 322 can then use this identifier reference number by placing it in a request and sending it to the social network application 109. In some implementations, the post retrieval module 322 is coupled to receive the identifier from the page identification module 324. The post retrieval module 322 retrieves these social network content items and then provides them to the stream producer 306 so that they may be processed and prepared for delivery to the client device 115. The post retrieval module 322 may also provide the content items related to the webpage from the social network to the freshness module 326 and the engagement module 328. Both of these modules 326, 328 process individual content items and assign a value or a rank to them as will be described in more detail below. In some implementations, the post retrieval module 322 is a set of instructions executable by the processor 204. In some implementations, the post retrieval module 322 is stored in the memory 206 of the social network server 101 and is accessible and executable by the processor 204. In some implementations, the post retrieval module 322 is adapted for cooperation and communication with the processor 204, the memory 206 and other components of the dynamic page classifier 103a via the bus 220.

The page identification module 324 can be software or routines for identifying a webpage. Once the webpage has been identified, the page identification number or reference can be provided to the post retrieval module 322 so that information related to that particular webpage can be retrieved from the social network application 109. In some implementations, the request received by the request handler 304 includes a canonical identifier that uniquely identifies the webpage. The request handler 304 sends the request to the page identification module 324 and the page identification module 324 extracts the canonical identifier corresponding to the webpage from the request. The page identification module 324 can then send the canonical identifier to the post retrieval module 322 so that it can use the canonical identifier in requesting social network content items related to the webpage. In other implementations, various other mechanisms, for example, combinations of user identification, cookies and other identifying information can be used to determine the webpage or a specific web address. In such implementations, the webpage or other identifying information can be sent by the page identification module 324 to the post retrieval module 322. In some implementations, the page identification module 324 is a set of instructions executable by the processor 204. In some implementations, the page identification module 324 is stored in the memory 206 of the social network server 101 and is accessible and executable by the processor 204. In some implementations, page identification module 324 is adapted for cooperation and communication with the processor 204, the memory 206 and other components of the dynamic page classifier 103a via the bus 220.

The freshness module 326 can be software or routines for determining the recentness of content items retrieved by the post retrieval module 322. The freshness module 326 is coupled to receive content items from the post retrieval module 322. In some implementations, the freshness module 326 uses the timestamp associated with each content item and assigns a recentness rank or value. The freshness module 326 provides this information to the determination module 308 and to the stream producer 306. The determination module 308 makes its determination of whether the webpage is dynamic or static based on the distribution of timestamps for content items in the stream. The stream producer 306 uses the recentness rank or value to determine whether a particular content item is included in the stream produced and presented to the user. In some implementations, the freshness module 326 is a set of instructions executable by the processor 204. In some implementations, the freshness module 326 is stored in the memory 206 of the social network server 101 and is accessible and executable by the processor 204. In some implementations, the freshness module 326 is adapted for cooperation and communication with the processor 204, the memory 206 and other components of the dynamic page classifier 103a via the bus 220.

The engagement module 328 can be software or routines for determining an engagement value associated with content items retrieved by the post retrieval module 322. The engagement module 328 is coupled to receive content items from the post retrieval module 322. In some implementations, the engagement module 328 retrieves an engagement value associated with each content item from the social network application 109. In some implementations, the engagement module 328 calculates an engagement value or rank associated with each content item. In either case, the engagement module 328 may use a number of factors to determine an engagement value, including, but not limited to, the following: 1) determines the state of whether messages in the content stream are unread or read; 2) determines the quality level of messages in the content stream; 3) receives global signals, for example, the popularity of a content item; 4) the number of shares or reshares of a content item; 5) whether the topic for the content item is popular; 6) whether the content item or its topic is trending; 7) the author of the content item; 8) the topic of the content item; 9) the time users were engaged with the content item; 10) the topics of interest to the user; 11) any other signals indicating greater engagement with a content item. The engagement module 328 provides this information to the determination module 308 and to the stream producer 306. The determination module 308 can use this information to make its determination of whether the webpage is dynamic or static. The stream producer 306 uses the engagement rank or value to determine whether a particular content item is included in the stream produced and presented to the user. In some implementations, the engagement module 328 is a set of instructions executable by the processor 204. In some implementations, the engagement module 328 is stored in the memory 206 of the social network server 101 and is accessible and executable by the processor 204. In some implementations, the engagement module 328 is adapted for cooperation and communication with the processor 204, the memory 206 and other components of the dynamic page classifier 103a via the bus 220.

Figure 4:
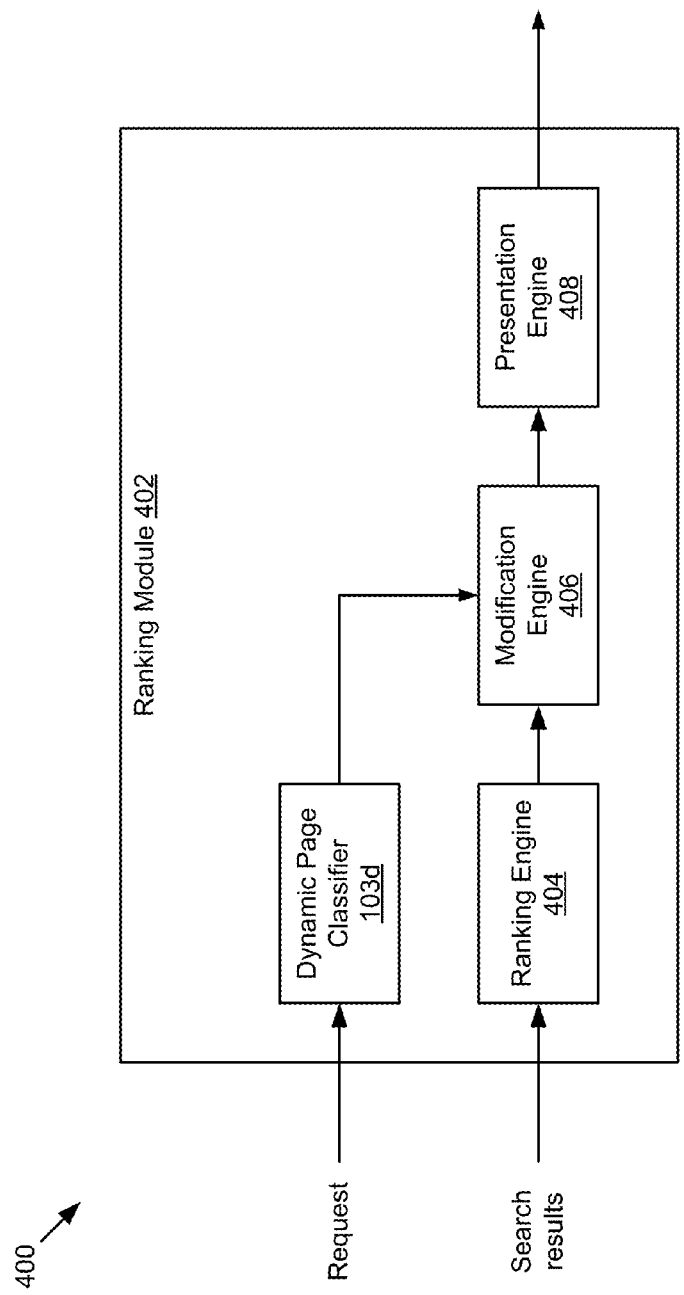
FIG. 4 is a block diagram illustrating an example ranking module including a dynamic page classifier.

It should be understood that the dynamic page classifier 103 will be primarily described in this application in the context of processing content items from a social network to determine which content items are most relevant to a user. However, it should be understood that the dynamic page classifier 103 could also be used in a variety of other context. FIG. 4 illustrates an example ranking module 402 including the dynamic page classifier 103d. For example, the ranking module 402 could be part of the search server 135. In this example, the dynamic page classifier 103d is coupled to receive a request, e.g., a search request for a particular webpage. The dynamic page classifier 103d processes the request to identify the particular webpage and determine whether the webpage is dynamic or static as has been described above. The determination of static or dynamic for the webpage is then sent to the modification engine 406.

The ranking engine 404 is software or routines for ranking search results based upon relevance to the user. The ranking engine 404 is coupled to receive the search results from an indexing engine or other source (not shown). The ranking engine 404 reorders the search results based upon terms in the request/query as well as other factors about the user. In some implementations, the ranking engine 404 is coupled for communication with the modification engine 406 to modify the ranking of the search results based on input signals from the modification engine 406. In some implementations, the modified search results are output from the ranking engine 404 to the presentation engine 408. In some implementations, the reordered results output by the ranking engine 404 are output to the modification engine 406, which further reorders the results and then provides them to the presentation engine 408.

The presentation engine 408 is software or routines for presenting search results for display to the user. The presentation engine 408 receives search results from the ranking engine 404 or the modification engine 406. The presentation engine 408 formats and sends the search results via the network 105 to the client device 115. The presentation engine 408 formats and sends these search results for presentation on the client device 115.

The modification engine 406 is software or routines for modifying the ranking of search results. The modification engine 406 is coupled to receive other types of information, e.g., public information about a user social graph, public information about user interaction with the social network, user interaction with a video sharing site, or any other system with which a user may interact for example but not limited to micro-blogs, comments, votes (e.g., indicating approval of particular content), other indications of interest (e.g., that promote content for consumption by other users), and playlists (e.g., for video or music content). In some implementations, users may be provided options to opt-in or opt-out of having this type of information being used. In some implementations, the modification engine 406 receives the classification of the web page provided by the dynamic page classifier 103d for modifying the ranking of search results. The modification engine 406 modifies the ranking of the search results using the page classification information. The re-ordered search results are sent from the modification engine 406 to the presentation engine 408.

In some implementations, the modification engine 406 utilizes the interactions of the user with video content, the social network content (or other users in the social network), or web content to make modifications in the ranking of search results. The timing or freshness of these user interactions may be used as a signal to rank particular content higher than other content. For example, if a particular action was taken by the user to interact with another user on the social network, or a friend of the user performs an action on content in the social network in a recent predetermined amount of time (e.g., within the last hour) that information can be used by the modification engine 406 to rank particular content higher than other content. As has been described above, the classification of a page as dynamic or static can be used along with user interactions as just described to weight or bias the search results to include more or fewer pages with greater timeliness or greater user engagement.

Figure 5:
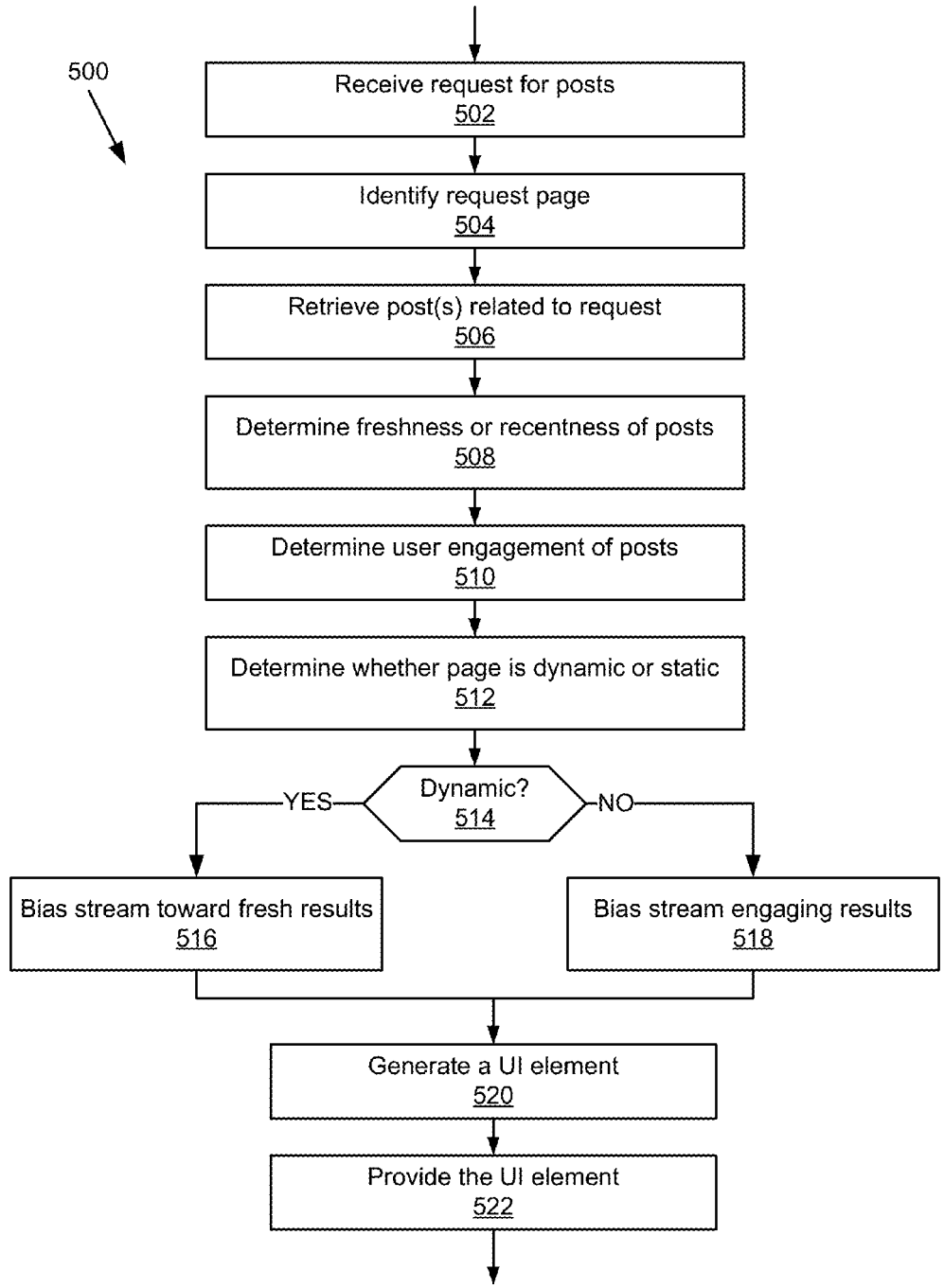
FIG. 5 is a flow chart of an example method for using a dynamic classifier to generate a stream of posts.

Referring now to FIG. 5, an example method 500 for using a dynamic classifier 103 to generate and present a stream of content items from a social network will be described. While the method 500 will now be described with reference to posts retrieved from a social network for convenience and ease of understanding, it should be understood that the method and user interface are applicable to any content items retrieved from a social network in addition to posts. The method 500 begins by receiving 502 a request for posts or content items from a social network. As noted above, the request may include some indicia that identifies the webpage and a user request for information from the social network related to that webpage. The method 500 then identifies 504 the requested page. For example, the indicia, e.g., the canonical identifier, may be extracted from the request and used to identify the web address for the webpage. The method 500 continues by retrieving 506 one or more posts related to the request since identification of the webpage is now known. For example, the post retrieval module 322 may retrieve content items or posts from the social network that are related to the webpage. The method 500 then determines 508 the freshness or recentness of the posts retrieved from the social network in block 506. For example, the freshness module 326 may process the posts and assign them a freshness or recentness rank or value as has been described above. The freshness or recentness value may be based upon the timestamp of when the content item was added or made publicly available on the social network. Next, the method 500 determines 510 user engagement values for the posts. The engagement module 328 may receive and process the posts retrieved in block 506 to assign a user engagement value to each of the posts. This user engagement value can be based on various factors as has been described above. Then the method 500 determines 512 whether the page is dynamic or static. The method 500 advantageously uses the distribution of timestamps of posts in the stream to make its determination as to whether the webpage is dynamic or static. In some implementations, the method 500 uses a series of heuristics to make its decision. A page is classified as dynamic if all of the conditions of the heuristics are met, otherwise it is classified as static. Some implementations for determining whether a page is dynamic or static are described in more detail below with reference to FIG. 6A-6C. Next the method 500 tests 514 whether the page was determined to be dynamic. If so, the method 500 proceeds from block 514 to block 516. At block 516, the method 500 biases the stream towards including more fresh results. For example, the method 500 may skip any default ranking and ordering pipeline and instead order the posts from newest to oldest based upon the timestamp. Next, a predetermined number of newest posts may be selected for presentation. After block 516, the method 500 continues in block 520. On the other hand, if in block 514 the method 500 determined that the page was not dynamic (e.g., the page is static), the process continues to block 518. In block 518, the method 500 biases the stream of content toward including more engaging content items. For example, the method 500 may rank the content items or posts by engagement value and selects a predetermined number of most engaging posts for presentation. After block 518, the method continues to block 520. In block 520, the method 500 generates a user interface element (e.g., see 802 of FIG. 8) and populates the user interface element with the predetermined number of posts from either block 516 or block 518. The user interface element orders the posts from top to bottom in the same order as they are provided from block 516 or 518. Then, the method 500 provides 522 the user interface element for display or presentation to the user.

Figure 6A:
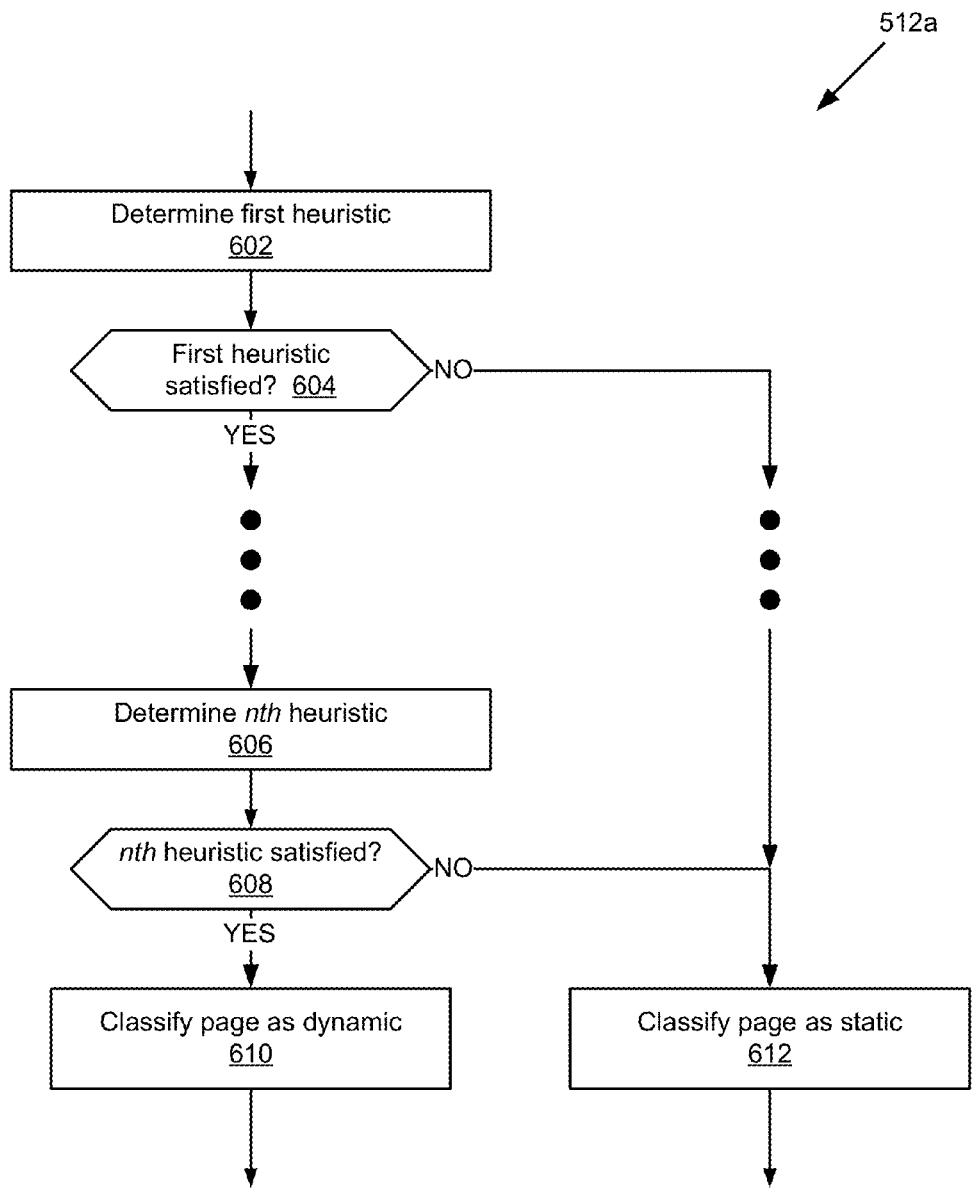
FIG. 6A is a flow chart of a general method for determining whether a page is dynamic or static.

Referring now to FIG. 6A, a general method 512a for determining whether a page is dynamic or static will be described. The method 512a illustrates that the dynamic page classifier 103 may include any number of heuristics from one to n. Moreover, each heuristic can be applied to analyze various different attributes of the content items from the social network, the attributes of the webpage, attributes or characteristics of the user or user behavior, or various other factors. The method 512a begins by determining 602 a first heuristic. Then the method 512a tests 604 whether the first heuristic was satisfied. If not, the method 512a proceeds to block 612 and classifies the page as static. However, if the first heuristic is determined in block 604 to be satisfied, the method 512a continues to determine 606 an nth heuristic. Then the method 512a tests 608 whether the nth heuristic was satisfied. If not, the method 512a proceeds to block 612 and classifies the page as static. However, if the nth heuristic is determined in block 604 to be satisfied, the method proceeds to block 6102 classified the page as dynamic. FIG. 6A is used to illustrate that any number of heuristics may be applied to determine whether a webpage is dynamic or static and that any number of different attributes may be analyzed by each individual heuristic in making that determination. Furthermore, it should be understood that other methods may not require that all heuristics are satisfied as shown in FIG. 6A, but rather may require only particular ones be satisfied or a particular number of a total to be satisfied.

Figure 6B:
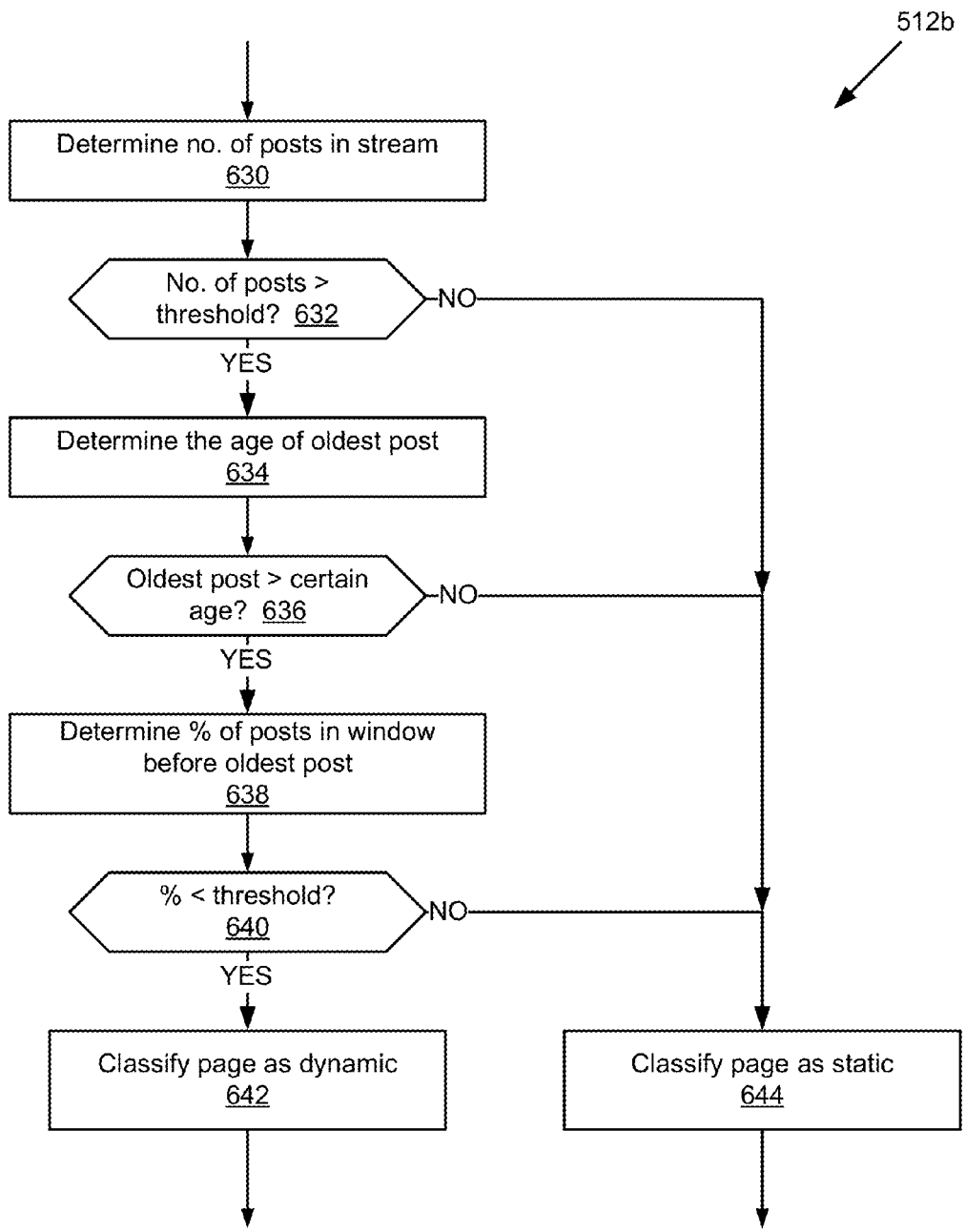
FIG. 6B is a flow chart of an example method for determining whether a page is dynamic or static.

FIG. 6B is a flow chart of an example method 512b for determining whether a page is dynamic or static. The dynamic page classifier 103 uses a series of heuristics to make the decision about whether a page is dynamic or static. Again, the page is classified as dynamic if all of the following conditions are met, otherwise the page is classified as static. The method 512b begins by determining 630 the number of posts in the stream related to the webpage. Then, the method 512b determines 632 whether the number of posts from block 630 is greater than a threshold. For example, the threshold may be 10 or more posts or content items. The stream of posts for the webpage needs to have enough post in order to make a decision. If there are not enough posts, the method assumes that the page is either not active or new. In this case, the regular ranking should suffice and the page is classified as static. If the number of posts corresponding to the webpage is not greater than the threshold, the method 512b continues to block 644 whether the page is classified is static. On the other hand, if the number of posts is determined to be greater than the threshold in block 632, the method 512b determines 634 an age of the oldest post. The method 512b then determines 636 whether an oldest post is greater than a certain age. For example, the certain age may be 30 days. If the method 512b determines in block 636 that the oldest post is not greater than the certain age, the method 512b proceeds to block 644 where the page is classified is static. In other words, if a webpage does not have at least one post that is greater than 30 days old, it is considered to be static—either new or not active. Dynamic pages need to show evidence of change whereas static pages have a majority of the posts in their stream shortly after they are published. Since the page doesn't change, newer posts become rare. The timestamp of the oldest post is used to approximate the published time of the page. However, if the method 512b determines in block 636 that the oldest post is greater than a certain age, the method 512b determines 638 a percentage of posts in the time window before the oldest post. The method 512b then determines 640 whether the percentage from block 638 is less than a threshold. For example, 50% of the post cannot be in a 72 hour window before the oldest post. If the percentage is determined to be greater than or equal to the threshold in block 640, the method 512b proceeds to block 644 to classify the page as static. However, if the percentage is determined to be less than the threshold in block 640, the method 512b continues to block 642 where the page is classified as dynamic.

Figure 6C:
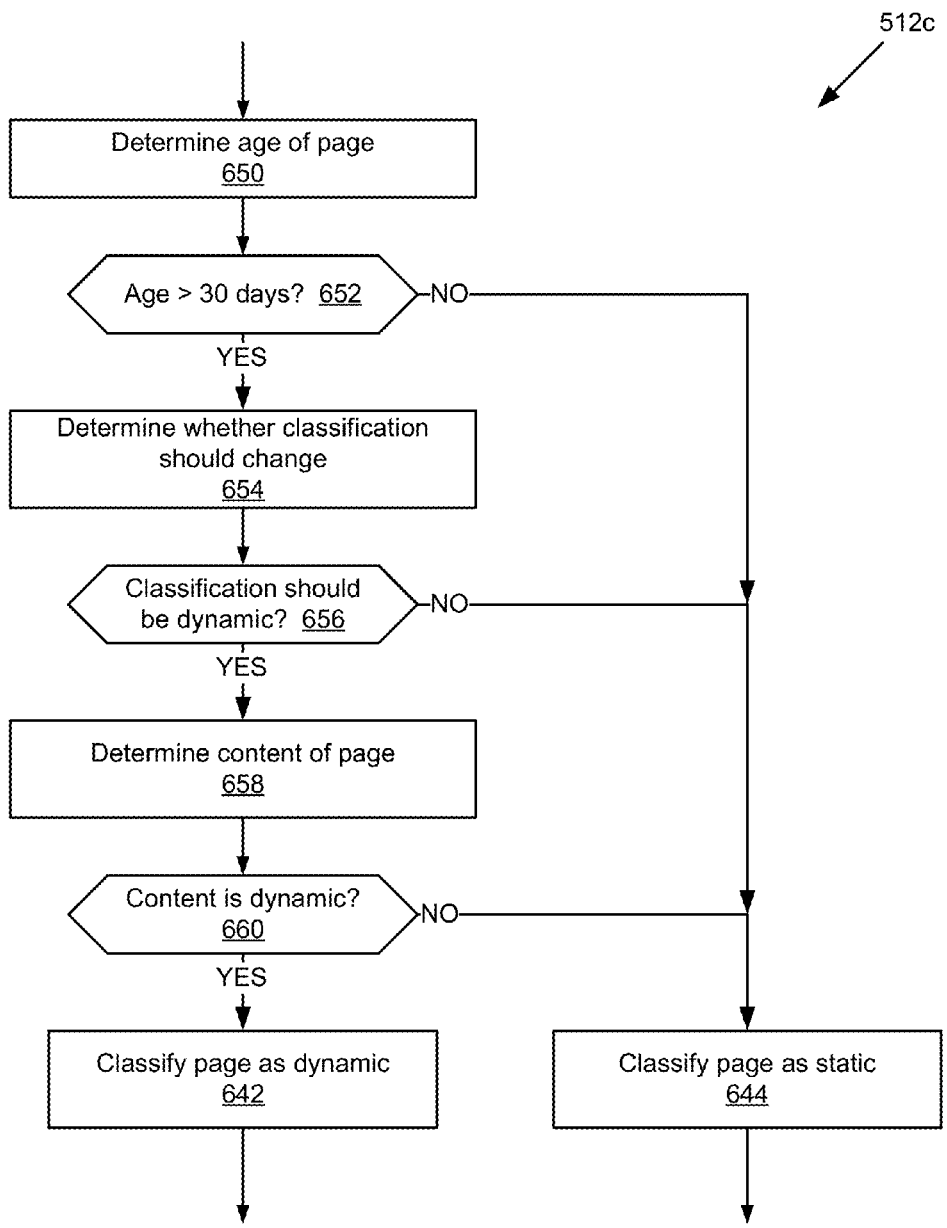
FIG. 6C is a flow chart of an additional heuristics for determining whether a page is dynamic or static.

FIG. 6C shows additional heuristics for determining whether a page is dynamic or static. It should be understood that these are merely examples of additional heuristics. While shown in a flowchart form, each heuristic may be used alone or in combination with the heuristics of FIG. 6B for making evaluations as to whether webpages are static or dynamic. The method 512c begins with a first heuristic. The method 512c determines 650 the age of the web page. Then, the method 512c determines 652 whether the age is greater than a threshold, in this case 30 days. If not, the method 512c classifies the page is static. This is similar to the second heuristic of FIG. 6B, but illustrates that other information could be used to determine the age of the page and in turn used to help classify the page.

The method 512c then determines 654 whether the classification should change from static to dynamic or vice versa. It is possible for a page to be initially classified as static but have its classification change due to resurgence of new posts. This change in classification is actually preferred since the method 512c will show posts from the latest resurgence rather than posts from the published time. It is also possible the page will have another resurgence making it have activity similar to a dynamic page. One example would be a page that predicts the outcome of medals earned during the Olympics. There are many posts during the initial publication of the page, then the page sees a resurgence after the Olympics are over by people discussing how accurate the predictions were. In such an example, the heuristic in block 654 will identify the correct classification for the page so that newer content related to the resurgence is shown by classifying the page as dynamic. The method 512c determines 656 whether the classification should be dynamic. Based on the information from block 654, the classification of the page will remain static or be changed to dynamic. There also could be cases where the page is currently classified as dynamic and gets changed to static. In any event, if the classification should not be dynamic the method proceeds to block 644 to classify the webpage as static.

If the classification should be dynamic, the method 512c continues to determine 658 the content of the page. In some implementations, the content of the page can be used to classify it as dynamic or static. This may require recording the state of every page at regular intervals. Such indexing information would be requested at the time of ranking In some implementations, some of the analysis can be done off-line and is stored into a database, or a machine learning model can be created for analysis of whether the content of the page is dynamic. Once the method 512c has determined the content of the page, it determines 660 whether the content is dynamic. If not, the method continues to block 644 to classify the page as static. However, if it is determined that the content is dynamic, the method classifies the page as dynamic in block 642.

Figure 7:
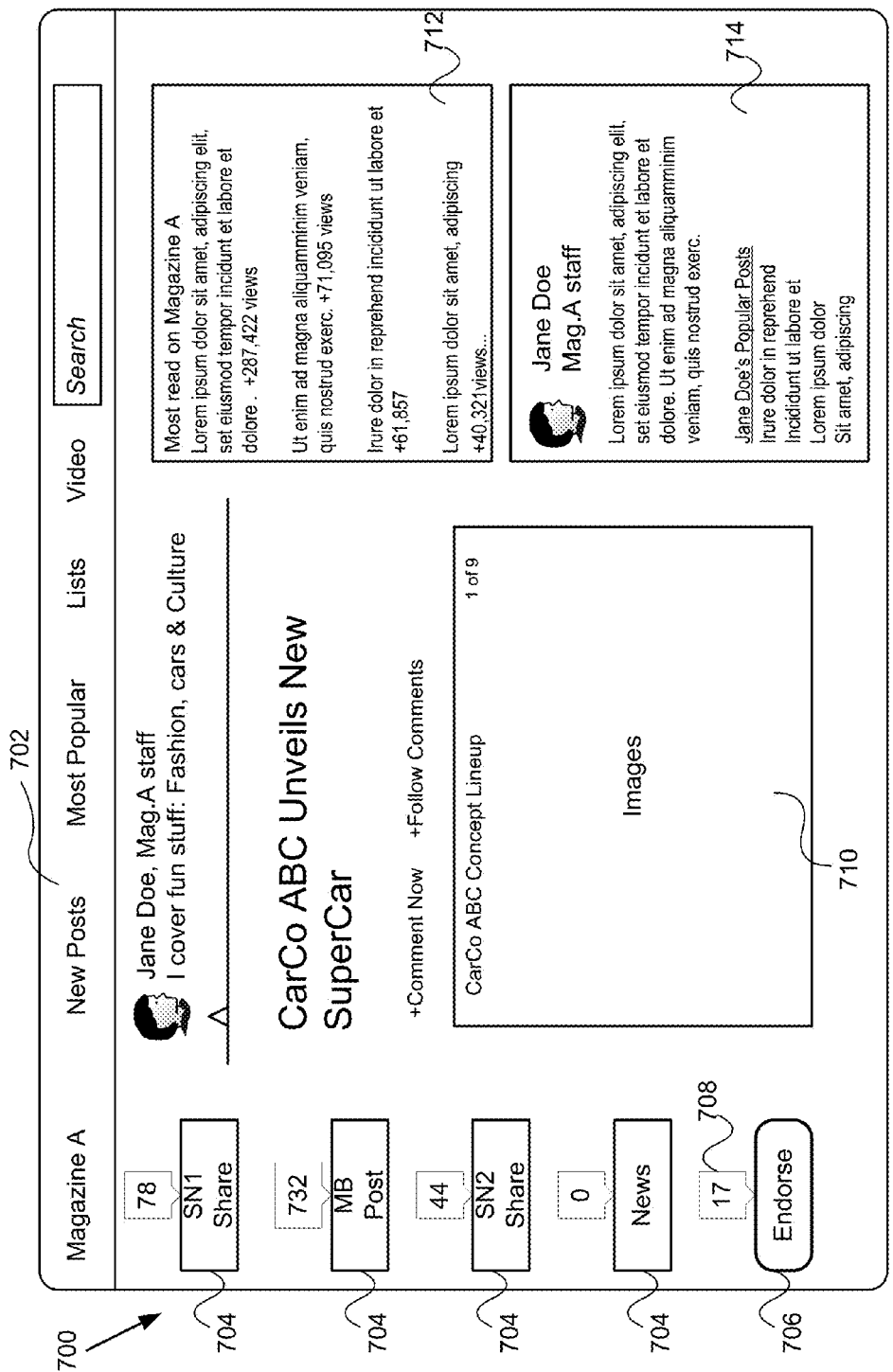
FIG. 7 is graphic representation of an example web page.

Referring now to FIGS. 7-10, various implementations of the user interface element on an example webpage will be described. The present disclosure includes modification of the user interface element to reorder or re-rank content items, e.g., posts from a social network. FIG. 7 shows an example web page 700 that is presented for the user and a beginning point for requesting related content from a social network. The graphical representation of the webpage shown in FIG. 7 is merely one example of an article by a magazine including text and graphics by a particular author, Jane Doe. It should be understood that the request for related content can be any button or action of the interface but will be described in the context of being associated with an endorsement button or action.

The webpage 700 includes a header 702 that is presented near the top of the page. The header includes information identifying the magazine, MagazineA and one or more links to transition to other pages such as new posts, most popular articles, lists, videos etc. The header 702 also includes a search box in which the user can enter text and search the website of MagazineA. Along the left edge of the webpage 700, a plurality of buttons 704, 706 are provided that allow the user to perform an action related to this webpage that the user is viewing. For example, the buttons 704 may allow the user to share the webpage with a first or second social network, post the webpage to the microblogging site, or post the website to a news site. One button 706 allows the user to endorse the webpage on a third social network as will be described in more detail below. In this example, the endorse button 706 includes an associated widget that updates how the endorsement button is presented and overlays the user interface element as will be described in more detail below with reference to FIGS. 8-10. Each of the buttons 704, 706 also has an annotation bubble positioned above it. In this example, the annotation bubble indicates the number of posts related to this webpage are present on each of the respective social networks or services. For example, the first social network has 78 related posts while the microblogging site has 732 posts. In this example, webpage 700, the content is an article about a car being released by CarCo that is provided by a regular contributor Jane Doe of the magazine's staff. The webpage may include a short descriptor of the author, the title for the article, images 710 related to the article, text of the article etc. The webpage also includes buttons for commenting on the article or following comments related to the article. The webpage on the right side includes a section 712 of links for other content provided by MagazineA including stats on popularity. Another section 714 provides additional information about the author such as a short bio as well as links to other articles posted by the author.

Figure 8:
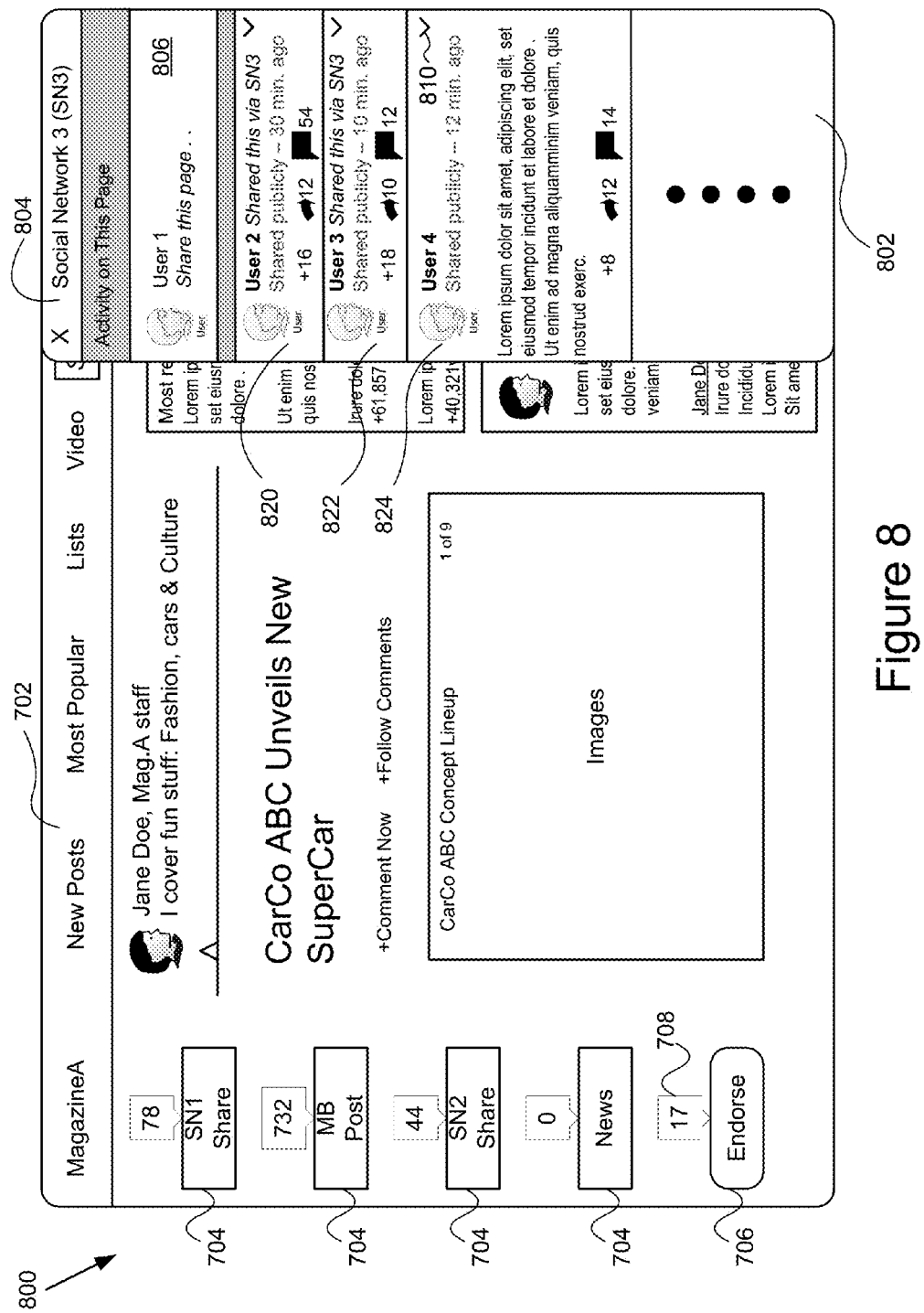
FIG. 8 is graphic representation of the example web page including a user interface element presenting posts related to the web page.

Referring now to FIG. 8, an updated webpage 800 is displayed. This is the same webpage as that of FIG. 7 so like reference numbers will be used to reference components having the same or similar functionality. As noted above, as the user interacts with the endorsement button 706, the webpage is updated. In some implementations, as the user hovers over the endorsement button 706 with a cursor, the annotation bubble 708 for the endorsement button 706 is updated. In some implementations, the annotation bubble 708 for the endorsement button 706 may be updated without user action in response to activity related to the webpage/canonical identifier that is taking place on the third social network. For example, an animation, e.g., a comment bubble icon indicating a general conversation about the canonical identifier, e.g., URL, is taking place on the third social network. It should be understood that other icons (not shown) could be displayed within the annotation bubble 708 to provide the user with more feedback about activity that is occurring on the third social network related to the web page. For example, if there were posts from friends of the user on the third social network the annotation bubble 708 may include a circles icon, or if the URL is trending (becoming popular in posts) a flame icon could be presented within the annotation bubble 708. It should be understood that various other icons may be inserted into the annotation bubble 708 to indicate other status related to the web page on the third social network. In some implementations, the icons displayed in the annotation bubble 708 may be presented with a looping animation with each icon presented for a predefined amount of time. Once the user hovers over the annotation bubble 708, the looping will stop and only display the relevant icon.

FIG. 8 shows an example web page 800 including a user interface element 802. The webpage 800 is the same as the webpage 700 described above with reference to FIG. 7. However, in FIG. 8, the user interface element 802 is overlaid over a left side portion of the webpage 800. The positioning of the user interface element 802 in the descriptions that follow is merely one example. The user interface element 802 could alternatively be positioned over a left side portion, a top portion or a bottom portion of the webpage 800. The user interface element 802 is shown with animation sliding from the periphery of the webpage 800 towards the center to cover a portion of it as depicted in FIG. 8. In some implementations, interacting with the endorsement button 706 causes the user interface element 802 to be presented, e.g., transitions the display shown in FIG. 7 to that shown in FIG. 8. In particular, selecting or clicking upon the annotation bubble 708 corresponding to the endorsement button 706 causes of the user interface element 802 to be displayed as depicted in FIG. 8. In some implementations, selecting or clicking upon the annotation bubble 708 corresponding to the endorsement button 706 when the user interface element 802 is being displayed acts as a toggle button and causes the user interface element 802 to close. In some implementations, the user interface will automatically close after a predetermined amount of time (e.g., three to 5 seconds) if the user does not interact with the user interface element, e.g., hover over it or take some other action.

The user interface element 802 includes a header 804, a share action 806, and one or more posts 820, 822 and 824. The header 804 includes an identifier of the social network from which the stream of content related to the web page and its associated canonical identifier in the user interface element 802 is being produced. The header 804 also includes a close button to close the user interface element 802. The share action 806 includes an image of the user (in this example, User 1) and instructions, and, when selected, the user interface element 802 is updated. The plurality of posts 820, 822 and 824 are shown in the user interface element 802 below the share action 806. Each of the posts 820, 822 and 824 includes an image or icon associated with the user, the user name, and an indication of how the post was shared. The post 820, 822 and 824 may also include when the post was shared and whether was shared publicly or privately. The post 820, 822 and 824 may include text images or other content as well. The posts 820, 822 and 824 may also include a drop-down menu to retrieve post activity or report abuse or spam. The post 820, 822 and 824 may also include action buttons for endorsing, re-sharing and commenting, as well as counts indicating the number of times those actions have already been taken by others related to the canonical identifier. In some implementations, the posts 820, 822 and 824 are ordered or ranked based upon affinity to the user. In this example the posts 820, 822 and 824 are shown ordered without classification of the webpage as either dynamic or static by the dynamic page classifier 103a and only by affinity to the user. More specifically, the posts 820, 822 and 824 are displayed ordered from top to bottom with a first post 820 from user 2, a second post 822 from user 3 and then third post 824 from user 4. Each of the posts include 820, 822 and 824 and a recentness value or rank as show by the time stamp as to when they were shared on the social network. Additionally, although not shown, for this example, it is assumed that the third post 824 from user 4 has the highest engagement rank or value, the second post 822 from user 3 has an intermediate engagement rank or value, and first post 820 from user 2 has a low engagement rank or value. Despite the engagement values and the time stamps, the post are ordered in the user interface element 802 based upon affinity to the user and thus the ordering is as shown.

Figure 9:
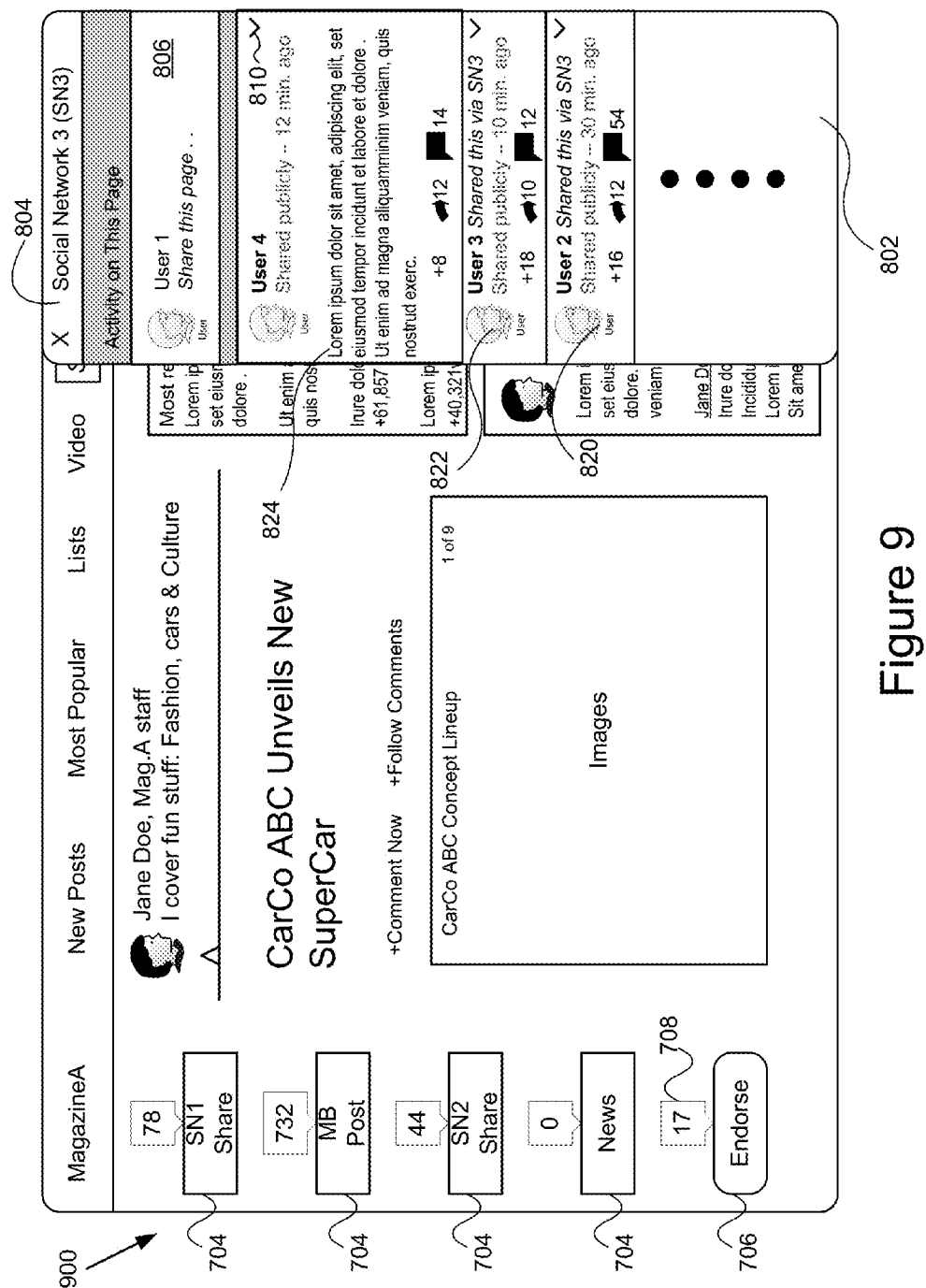
FIG. 9 is graphic representation of the example web page including the user interface element presenting posts related to the web page where the web page is classified as static.

FIG. 9 shows the example web page 900 including the user interface element 802 presenting posts 820, 822 and 824 related to the web page where the web page is classified as static. For this example, it is assumed that the web page has been classified as static and that the stream of posts 820, 822 and 824 related to the web page are similar to those shown in FIG. 8. However, in contrast to FIG. 8, the ordering of the posts 820, 822 and 824 in the user interface element 802 is different. Since the webpage is static, the posts 820, 822 and 824 are ordered based upon user engagement value. As noted above, the third post 824 from user 4 has the highest engagement rank or value, the second post 822 from user 3 has an intermediate engagement rank or value, and first post 820 from user 2 has a low engagement rank or value. Therefore, the methods of the present disclosure orders the posts 824, 822 and 820 from top to bottom in the user interface element 802 in that order. As compared with the ordering of FIG. 8, the third post 824 is ordered at the top while the first post 820 is at the bottom.

Figure 10:
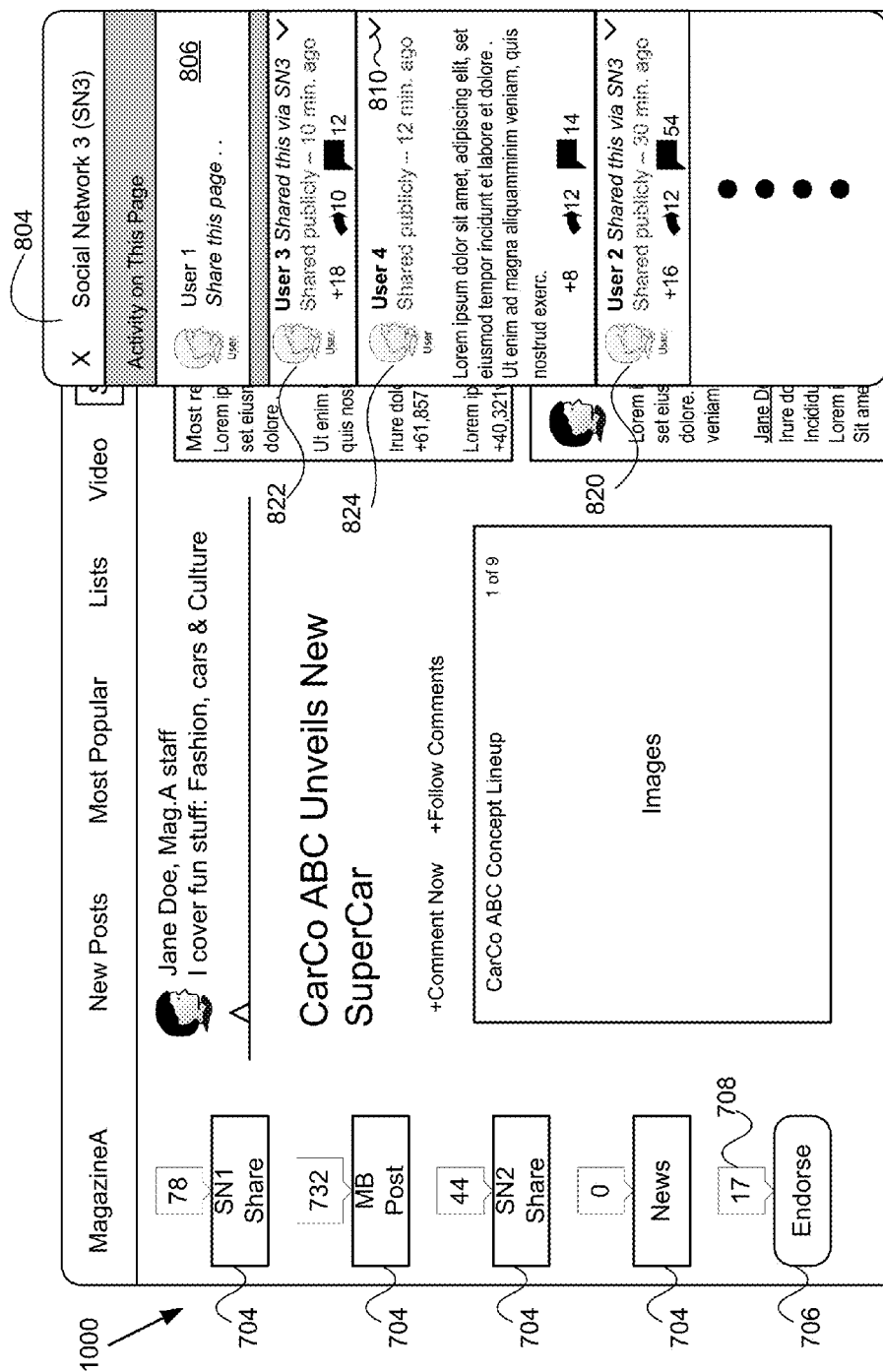
FIG. 10 is graphic representation of the example web page including the user interface element presenting posts related to the web page where the web page is classified as dynamic.

FIG. 10 shows the example web page 1000 including the user interface element 802 presenting posts 820, 822 and 824 related to the web page where the web page is classified as dynamic. Again, for this example, it is assumed that the web page has been classified as dynamic and that the stream of posts 820, 822 and 824 related to the web page are similar to those shown in FIG. 8. However, in contrast to FIGS. 8 and 9, the ordering of the posts 820, 822 and 824 in the user interface element 802 is different. Since the webpage is dynamic, the posts 820, 822 and 824 are ordered based upon recentness value or timestamp. As noted above, the second post 822 from user 3 was shared publicly 10 minutes ago, the third post 824 from user 4 was shared publicly 12 minutes ago, and the first post 820 from user 2 was shared publicly 30 minutes ago. Therefore, the methods of the present disclosure orders the posts 822, 824 and 820 from top to bottom in the user interface element 802 in that order based on recentness of posting. As compared with the ordering of FIG. 8, the second post 822 is ordered at the top while the first post 820 is at the bottom.

Systems and methods for generating a stream of content using a dynamic page classifier and providing the stream of content in a user interface element with the related web page have been described. While the present disclosure is described in the context of a social network, it should be understood that the terms "products" and "services" are used interchangeably throughout this specification and are used herein to encompass their plain and ordinary meaning including, but not limited to, any online service, online product, or online software that provides online endorsement services to users.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above are primarily in the context of on line services; however, the disclosed technologies apply to other data sources and other data types (e.g., collections of other resources, for example, images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing," "computing," "calculating," "determining," "displaying," or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The disclosed technologies can take the form of entirely hardware implementations, entirely software implementations or implementations containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will become apparent from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies, and other aspects are not mandatory or significant, and the mechanisms that implement the present techniques and technologies or its features may have different names, divisions and/or formats. Furthermore, the modules, routines, features, attributes, methodologies, and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
   identifying, using one or more processors, a page on a website;
   retrieving, using the one or more processors, from an online source, a stream of posts related to the page;
   determining, using the one or more processors, the page is dynamic by analyzing a percentage of the stream of posts in a time window before an oldest post is less than a first threshold;
   in response to the page being determined to be dynamic, modifying the stream of posts related to the page biased toward including more recent posts;
   generating, using the one or more processors, a user interface element for display of the modified stream of posts; and
   providing, using the one or more processors, the user interface element for presentation to the user, the user interface element being overlaid over the page without affecting original content of the page.

2. The method of claim 1 comprising in response to the page being determined not to be dynamic, generating a modified stream of posts biased toward including more engaging posts.

3. The method of claim 1 comprising determining a recentness of one or more posts related to the page.

4. The method of claim 1 comprising determining user engagement with one or more posts related to the page.

5. The method of claim 1 wherein determining whether the page is dynamic further includes:
   determining a number of posts in the stream of posts related to the page; and
   determining an age of the oldest post in the stream of posts related to the page.

6. The method of claim 5 wherein a page is dynamic if the number of posts in the stream of posts related to the page is greater than a second threshold, the age of the oldest post in the stream of posts related to the page is older than a set date, and the percentage of posts in the time window before the oldest post is less than the first threshold.

7. The method of claim 1 wherein determining whether the page is dynamic includes:
   determining an age for the page;
   determining content of the page; and
   wherein a page is dynamic if the age of the page is greater than a set time, and the content of the page is determined to be dynamic.

8. A computer program product comprising a non-transitory computer usable medium including a computer readable program, wherein the computer readable program when executed on a computer causes the computer to:

identify a page on a website;

retrieve from an online source a stream of posts related to the page;

determine the page is dynamic by analyzing a percentage of the stream of posts in a time window before an oldest post is less than a first threshold;

in response to the page being determined to be dynamic, modify the stream of posts related to the page biased toward including more recent posts;

generate a user interface element for display of the stream of related content; and provide the user interface element for presentation to the user, the user interface element being overlaid over the page without affecting original content of the page.

9. The computer program product of claim 8 wherein the computer readable program when executed on a computer also causes the computer in response to the page being determined not to be dynamic, to generate a modified stream of posts biased toward including more engaging posts.

10. The computer program product of claim 8 wherein the computer readable program when executed on a computer also causes the computer to determine a recentness of one or more posts related to the page.

11. The computer program product of claim 8 wherein the computer readable program when executed on a computer also causes the computer to determine user engagement with one or more posts related to the page.

12. The computer program product of claim 8 wherein the computer readable program when executed on a computer also causes the computer to:

determine a number of posts in the stream of posts related to the page; and determine an age of the oldest post in the stream of posts related to the page.

13. The computer program product of claim 12 wherein a page is dynamic if the number of posts in the stream of posts related to the page is greater than a second threshold, the age of the oldest post in the stream of posts related to the page is older than a set date, and the percentage of posts in the time window before the oldest post is less than the first threshold.

14. The computer program product of claim 8 wherein the computer readable program when executed on a computer also causes the computer to:

determine an age for the page;

determine content of the page; and wherein a page is dynamic if the age of the page is greater than a set time, and the content of the page is determined to be dynamic.

15. A system comprising:

a processor; and a memory storing instructions that, when executed, cause the system to:

identify a page on a website;

retrieve from an online source a stream of posts related to the page;

determine the page is dynamic by analyzing a percentage of the stream of posts in a time window before an oldest post is less than a first threshold;

in response to the page being determined to be dynamic, modify the stream of posts related to the page biased toward including more recent posts;

generate a user interface element for display of the stream of related content; and provide the user interface element for presentation to the user, the user interface element being overlaid over the page without affecting original content of the page.

16. The system of claim 15 wherein the memory also stores instructions that, when executed, cause the system in response to the page being determined not to be dynamic, to generate a modified stream of posts biased toward including more engaging posts.

17. The system of claim 15 wherein the memory also stores instructions that, when executed, cause the system to determine a recentness of one or more posts related to the page.

18. The system of claim 15 wherein the memory also stores instructions that, when executed, cause the system to determine user engagement with one or more posts related to the page.

19. The system of claim 15 wherein the memory also stores instructions that, when executed, cause the system to:

determine a number of posts in the stream of posts related to the page; and determine an age of the oldest post in the stream of posts related to the page.

20. The system of claim 19 wherein a page is dynamic if the number of posts in the stream of posts related to the page is greater than a second threshold, the age of the oldest post in the stream of posts related to the page is older than a set date, and the percentage of posts in the time window before the oldest post is less than the first threshold.

21. The system of claim 15 wherein the computer readable program when executed on a computer also causes the computer to:

determine an age for the page;

determine content of the page; and wherein a page is dynamic if the age of the page is greater than a set time, and the content of the page is determined to be dynamic.

* * * * *